United States Patent
Mannheim Astete et al.

(10) Patent No.: US 11,718,551 B2
(45) Date of Patent: Aug. 8, 2023

(54) METHOD FOR MANUFACTURING FLUSH VEHICLE GLAZING

(71) Applicant: AGP America S.A., Ciudad de Panama (PA)

(72) Inventors: Mario Arturo Mannheim Astete, Lima (DE); Jean Marie Le Ny, Baesweiler (DE)

(73) Assignee: AGP America S.A., Panama (PA)

( * ) Notice: Subject to any disclaimer, the term of this patent is extended or adjusted under 35 U.S.C. 154(b) by 207 days.

(21) Appl. No.: 17/256,593

(22) PCT Filed: Jun. 28, 2019

(86) PCT No.: PCT/IB2019/055535
§ 371 (c)(1),
(2) Date: Dec. 28, 2020

(87) PCT Pub. No.: WO2020/003251
PCT Pub. Date: Jan. 2, 2020

(65) Prior Publication Data
US 2021/0300811 A1    Sep. 30, 2021

Related U.S. Application Data (60) Provisional application No. 62/692,764, filed on Jun. 30, 2018.

(51) Int. Cl.
*C03B 33/08* (2006.01)
*B60J 1/00* (2006.01)
(Continued)

(52) U.S. Cl.
CPC ............. *C03B 33/082* (2013.01); *B60J 1/001* (2013.01); *B60J 1/02* (2013.01); *C03B 23/0252* (2013.01); *C03B 23/03* (2013.01)

(58) Field of Classification Search
CPC ......... C03B 23/02; C03B 23/03; C03B 33/08; C03B 21/02; C03B 33/09; C03B 33/102;
(Continued)

(56) References Cited

U.S. PATENT DOCUMENTS 3,753,840 A * 8/1973 Plumat ................ C03B 23/0305
65/106
9,334,188 B2 * 5/2016 Saito ....................... C03B 33/07
(Continued)

FOREIGN PATENT DOCUMENTS

CN            1035278 A  *  9/1989  ............. C03B 21/02
JP       H02311323 A  *  12/1990  ............. C03B 23/03
(Continued)

*Primary Examiner* — Galen H Hauth
*Assistant Examiner* — Steven S Lee
(74) *Attorney, Agent, or Firm* — The Morales Law Firm; Joseph L. Morales, Esq.

(57) ABSTRACT

Method for manufacturing a flush vehicle glazing that allows to achieve a perfect alignment between the adjacent sections of the glazing vehicle area in the final assembled product by providing a vehicle glass panel which comprise at least two adjacent sections of the vehicle glazing area in one single panel, followed by bending the vehicle glass panel and LASER cutting before cooling thereof.

8 Claims, 7 Drawing Sheets

(51) Int. Cl.
*B60J 1/02* (2006.01)
*C03B 23/025* (2006.01)
*C03B 23/03* (2006.01)

(58) Field of Classification Search
CPC . C03B 33/0222; C03B 23/0252; C03B 23/30; C03B 23/023; C03B 33/082; C03B 33/091
See application file for complete search history.

(56) References Cited

U.S. PATENT DOCUMENTS

| | | | | |
|---|---|---|---|---|
| 2011/0067450 | A1* | 3/2011 | Fredholm | C03B 23/0357 65/286 |
| 2013/0291598 | A1* | 11/2013 | Saito | B23K 26/0736 65/112 |
| 2014/0216108 | A1* | 8/2014 | Wiegel | C03B 33/082 65/56 |
| 2014/0272338 | A1* | 9/2014 | Vandal | C03C 17/008 427/163.1 |
| 2015/0075222 | A1* | 3/2015 | Mader | B23K 26/40 65/271 |
| 2015/0166391 | A1* | 6/2015 | Marjanovic | B23K 26/0624 428/192 |
| 2015/0166394 | A1* | 6/2015 | Marjanovic | B23K 26/0884 428/192 |
| 2015/0183679 | A1* | 7/2015 | Saito | C03B 33/04 65/112 |
| 2015/0367782 | A1* | 12/2015 | Mannheim Astete | G02F 1/1333 349/12 |
| 2016/0137550 | A1* | 5/2016 | Murata | C03C 21/002 428/141 |
| 2016/0176746 | A1* | 6/2016 | Hunzinger | C03B 23/02 65/53 |

FOREIGN PATENT DOCUMENTS

| | | | | |
|---|---|---|---|---|
| JP | 2017145190 A | * | 8/2017 | ....... B32B 17/10036 |
| WO | WO-2013084877 A1 | * | 6/2013 | ............. B23K 26/40 |
| WO | WO-2014010600 A1 | * | 1/2014 | ............. C03B 33/04 |

* cited by examiner

METHOD FOR MANUFACTURING FLUSH VEHICLE GLAZING

FIELD OF THE INVENTION

The present disclosed invention relates to a method for manufacturing a flush vehicle glazing, and more particularly to a method for manufacturing a flush vehicle glazing by using a LASER for cutting a curved glazing.

BACKGROUND OF THE INVENTION

In assembled products, the original form has been divided for different reasons, such as manufacturability, safety issues, replacement parts, etc. In the case of automobiles, part of the assembly corresponds to the vehicle glazing area. The vehicle glazing area needs to be divided into windshield, roof, backlite among others for satisfying functional reasons.

Figure 1A:
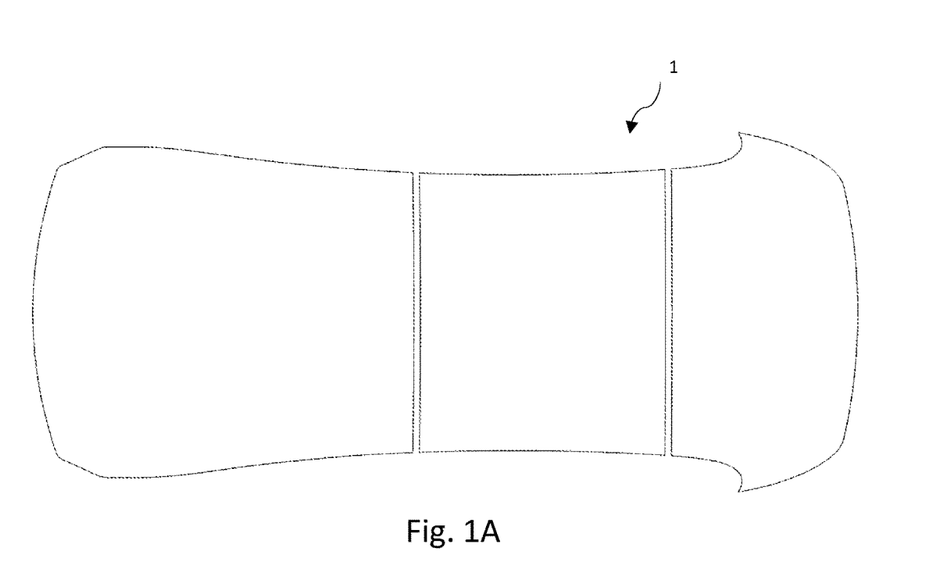
FIG. 1A shows pieces of a vehicle glazing area cut in flat separately

The traditional manufacturing process comprises the cutting and bending of each of these pieces separately. As shown in FIG. 1A in first instance, the pieces are cut in flat glass 1 separately and most of the times by mechanical cutting means. After this, they are bent individually. In the bending process, a glass sheet is bent in order to adopt a specific permanent shape by using a bending technique such as gravity bending, press bending, hot bending or any other well-known in the art.

Regarding the mechanical cutting of the individual pieces, it reduces the strength of the glass by 60% on average. The edges are the weakest zone, the strength of the individual pieces could be increased by treating the edges. The most common method is grinding followed by polishing. However, the strength of the glass increases only by approximately 30%.

Figure 1B:
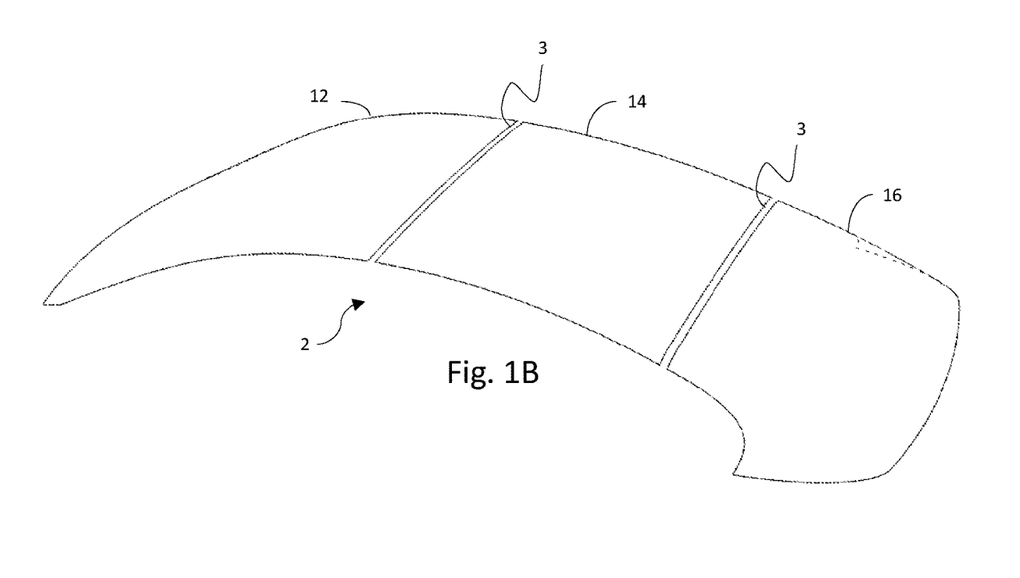
FIG. 1B shows pieces of a vehicle glazing area assembled with gaps.

Once the vehicle glazings are assembled as shown in FIG. 1B, the fit-up of the individual pieces is inspected by measuring the width of the gap 3 between two adjacent panels and the alignment of the two surfaces, also called flushness.

Considering the traditional manufacturing process, it is difficult to achieve a good alignment in the final assembled product due to geometry deviation during the manufacturing process. Since cutting and bending are carried out in each piece separately, when assembling, both the contours and the surfaces can create a significant gap.

The gaps between the individual pieces in an assembled product can be critical for the aerodynamics, acoustic and the aesthetic quality of a product. The aerodynamic drag coefficient is a measure of the effectiveness of a streamline aerodynamic body shape in reducing the air resistance to the forward motion of a vehicle. These gaps increase the drag coefficient causing a high air resistance when the vehicle is in motion, thereby, increasing the fuel consumption of the vehicle. Likewise, due to the gaps, the airflow in the vehicle glazing area is substantially more turbulent increasing the wind noise inside the vehicle. On the other hand, the appearance of vehicles having a series of glass pieces adjacent to one another with gaps in the middle thereof is not particularly aesthetically attractive.

In this sense, it would be desirable to provide a method that allows the manufacturing of a vehicle gazing area without gaps between the adjacent surfaces in a way that reduces or eliminates the problems described above.

SUMMARY OF THE INVENTION

It is an object of the present invention to provide a method for manufacturing a flush vehicle glazing that allows to achieve a perfect alignment between the adjacent sections of the glazing vehicle area in the final assembled product.

This object can be attained by a method of manufacturing a flush vehicle glazing comprising a vehicle glass panel that has at least two adjacent sections of a vehicle glazing area. The vehicle glass panel is heated inside a furnace at a predetermined temperature $T_1$ for a predetermined period of time $t_3$ for bending it by a bending process, wherein the temperature $T_1$ ranges from about a temperature at which the viscosity of the vehicle glass panel is $10^{13.6}$ Pa·s to a temperature at which the viscosity of the vehicle glass panel is $10^9$ Pa·s and the time $t_3$ is enough to impart a selected permanent curvature to the vehicle glass panel. Then, the bent vehicle glass panel is cut inside the furnace in the adjacent sections along a cut line before the bent vehicle glazing anneals, while it stands at local temperature $T_2$, wherein the temperature $T_2$ ranges from about a temperature at which the viscosity of the cut line is $10^{12.4}$ Pa·s to a temperature at which the viscosity of the cut line is $10^9$ Pa·s; and finally the cut vehicle glass panel is cooled.

As can be noted, by bending a single panel that contains all the desired adjacent sections of the vehicle glazing area and cutting it before cooling, the method of the present invention allows to overcome the difficulties in the assembly of the vehicle glazing manufactured by a traditional process.

Also, by improving the spatial relation between the adjacent sections, the aesthetic quality of the vehicle is improved as well as the aerodynamics and acoustics, which means, the reduction of fuel consumption and noise due to turbulence. Furthermore, by cutting the vehicle glass panel with suitable cutting means, such as a high-power LASER, low roughness and smooth surfaces are generated, improving the edge quality and the glass hardness.

NUMERAL REFERENCES

1 Flat glass
2 Vehicle glazing area
3 Gap
10 Vehicle glass panel
11 Adjacent sections
12 Windshield
14 Roof
16 Backlite
20 Bent vehicle glass panel
22 LASER
30 Flush vehicle glazing
32 Split-line

BRIEF DESCRIPTION OF THE DRAWINGS

These features and advantages of the present invention will become apparent from the detailed description of the following embodiments in conjunction with the accompanying drawings, wherein.

DETAILED DESCRIPTION OF THE INVENTION

Referring now to the drawings, there are shown preferred embodiments of the method for manufacturing a flush vehicle glazing.

For invention disclosure purposes, the vehicle glazing area 2 would be comprised by windshield 12, roof 14 and backlite 16 as shown in FIG. 1B.

Figure 2:
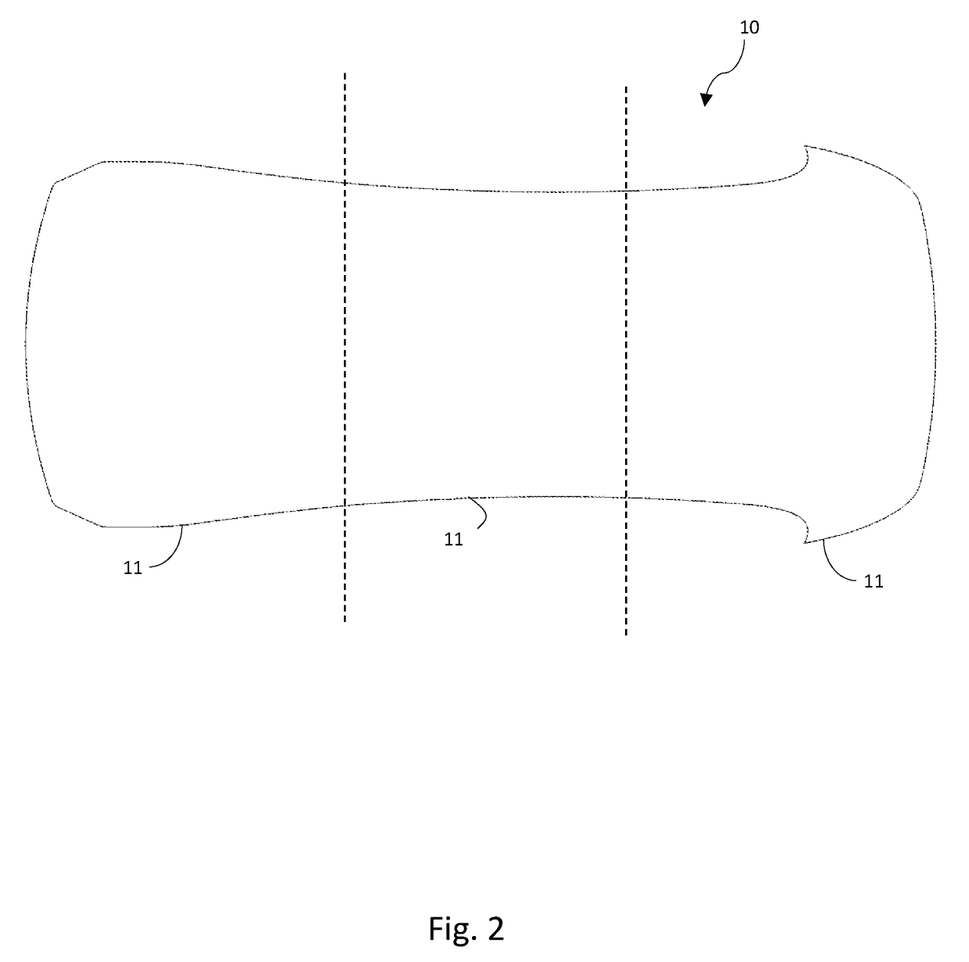
FIG. 2 shows a first embodiment of the invention.
Figure 3:
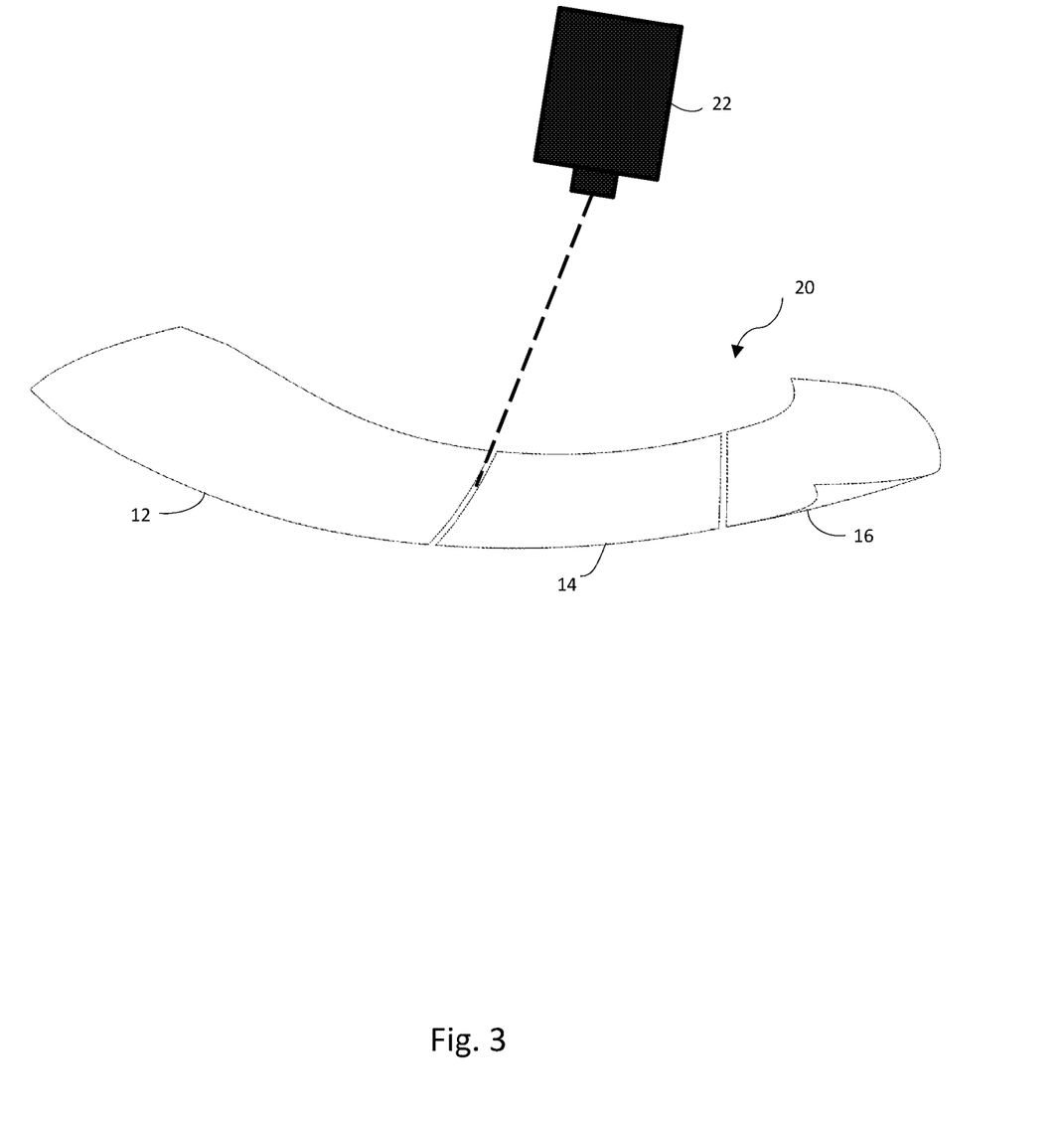
FIG. 3 shows a bent vehicle glass panel being divided in three sections, windshield, roof and backlite by LASER cutting.
Figure 4:
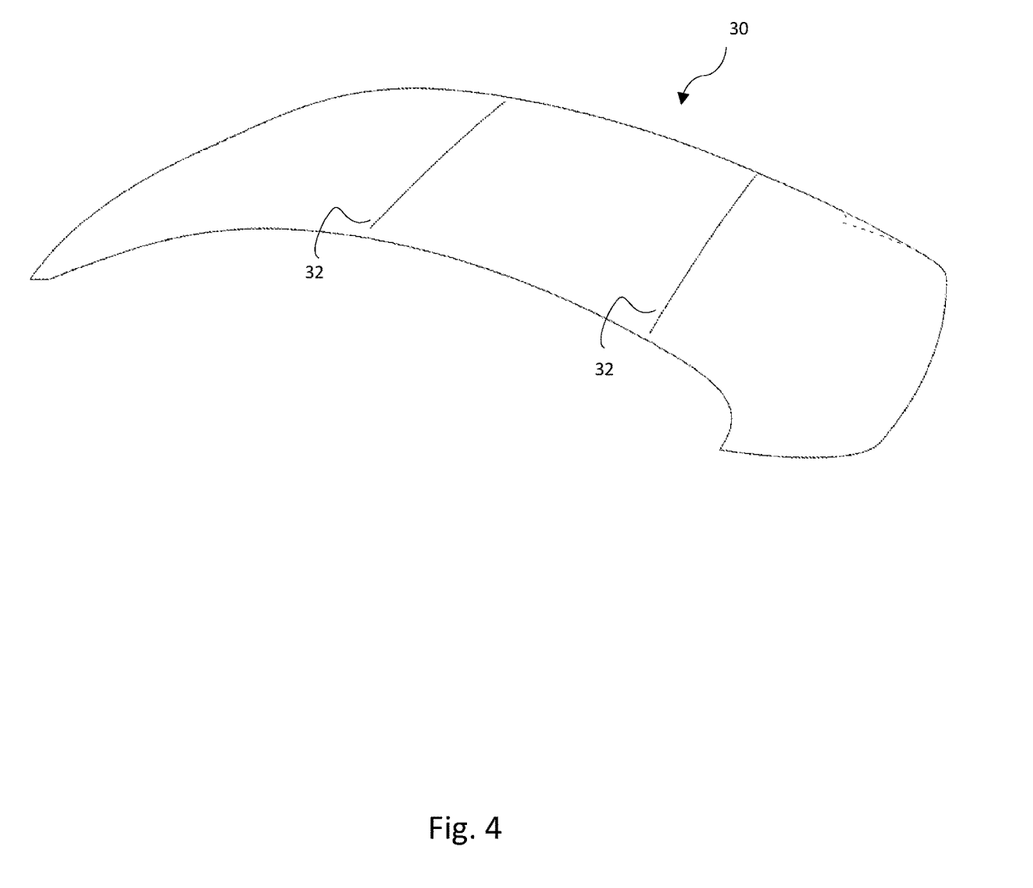
FIG. 4 shows a flush vehicle glazing with no gap between adjacent sections.

In a first embodiment, the vehicle glass panel 10 comprises three adjacent sections 11 of the glazing vehicle area, windshield-roof-backlite in one single part as shown in FIG. 2. The vehicle glass panel 10 is heated inside a furnace at a predetermined temperature $T_1$ for a predetermined period of time $t_3$ for bending it by a bending process. The temperature $T_1$ ranges from about a temperature at which the viscosity of a vehicle glass panel 10 is $10^{13.6}$ Pa·s to a temperature at which the viscosity of the vehicle glass panel 10 is $10^9$ Pa·s and the time $t_3$ is enough to impart a selected permanent curvature to the vehicle glass panel 10. Then, the bent vehicle glass panel 20 is divided in the three aforementioned sections 11, windshield 12, roof 14 and backlite 16 by a high-power LASER 22 cutting as shown in FIG. 3. The bent vehicle glass panel 20 is cut inside the furnace along a cut line, i.e, before the bent vehicle glazing anneals, while it stands at a local $T_2$, wherein the temperature $T_2$ ranges from about a temperature at which the viscosity of the cut line is $10^{12.4}$ Pa·s to a temperature at which the viscosity of the cut line is $10^9$ Pa·s, being the highest value of $T_1$ greater or equal than temperature $T_2$. After that, the cut vehicle glass panel is cooled. The result is an excellent degree of flushness between the adjacent sections 11 of the glazing vehicle area in the final assembled product, i.e, a flush vehicle glazing 30 with no gap between adjacent surfaces as shown in FIG. 4.

The contours of the individual geometries create a spatial relation defined as a split-line 32. In the case of the final product, said split-line it is not a gap that stands out at the sight but a line that is hardly noticed.

Figure 5:
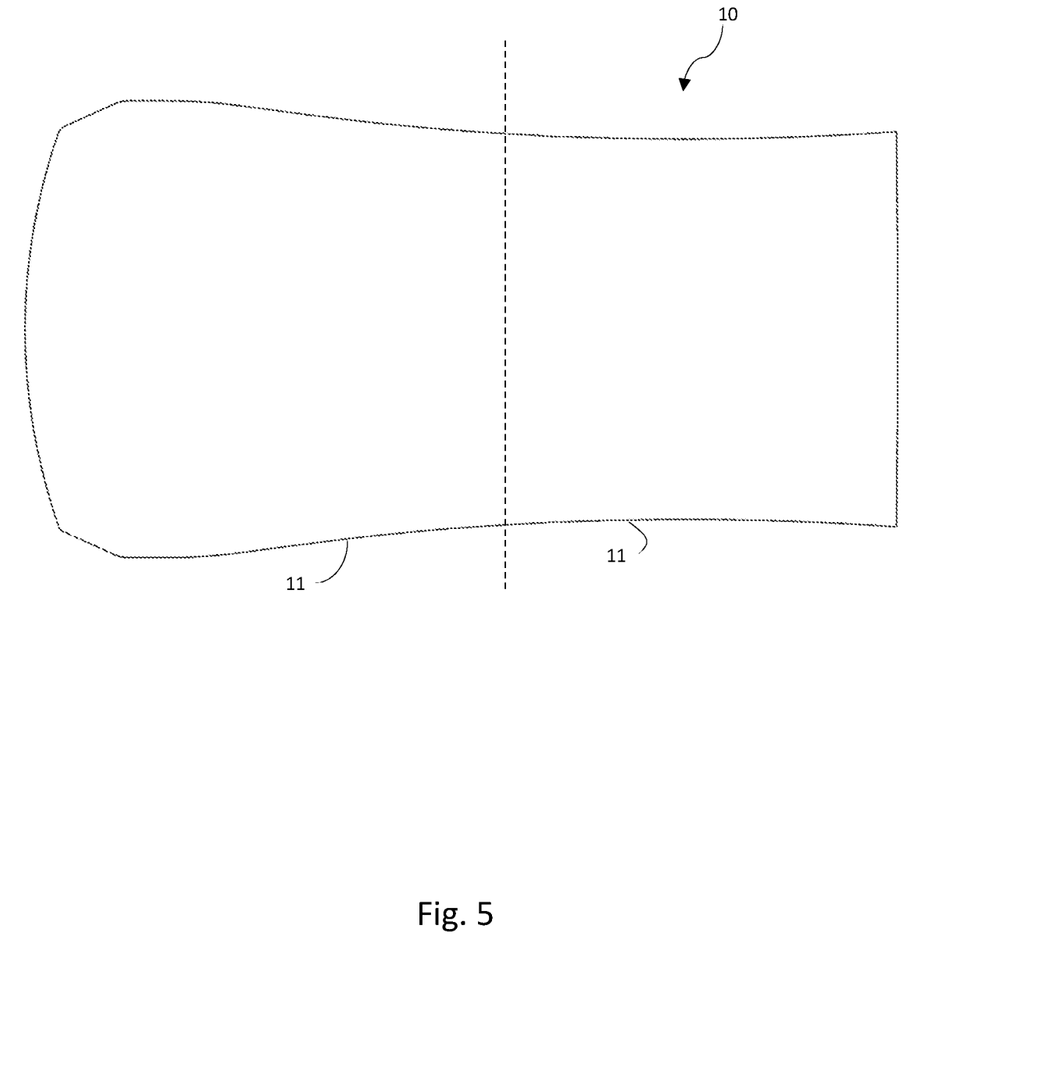
FIG. 5 shows a second embodiment of the invention.

In a second embodiment, the vehicle glass panel 10 comprises two adjacent sections 11 of the glazing vehicle area, windshield-roof in one single part, as shown in FIG. 5. The subsequent steps are the same as the previous embodiment, and consequently an excellent degree of flushness between said two adjacent sections 11 is obtained.

Figure 6:
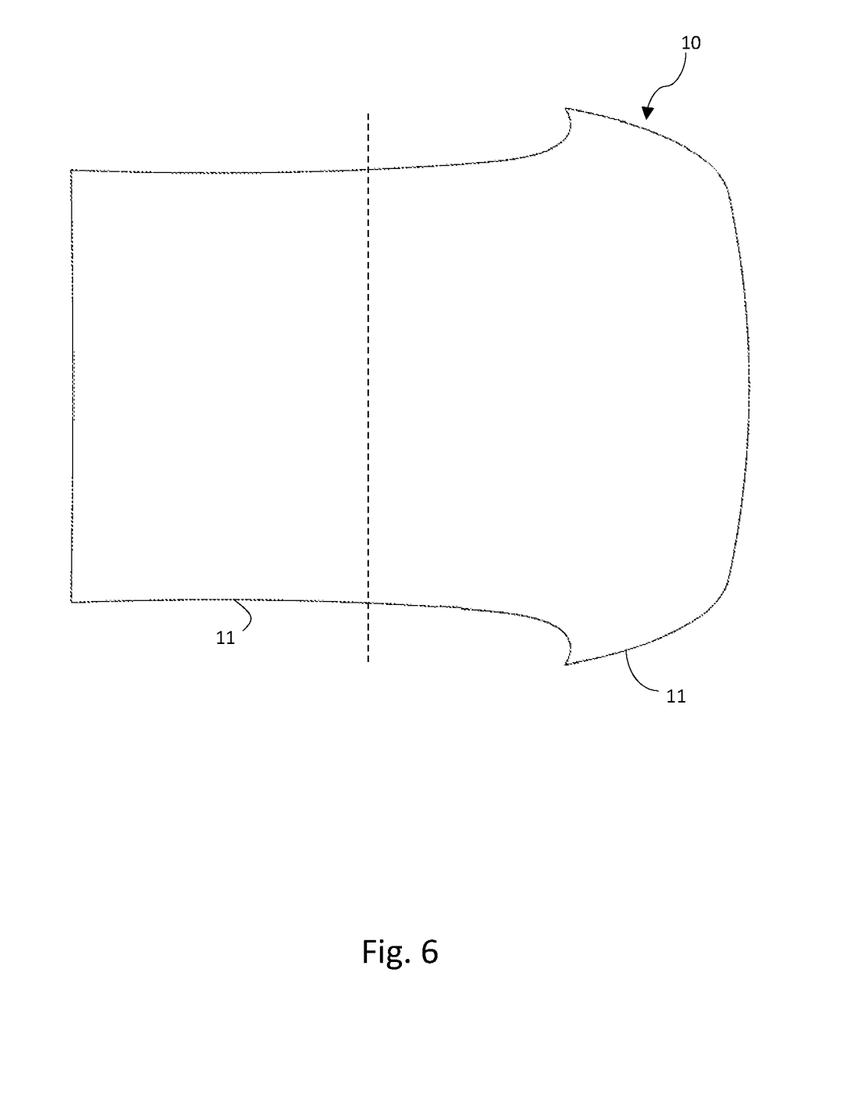
FIG. 6 shows a third embodiment of the invention.

Likewise, in a third embodiment, the vehicle glass panel 10 comprises two adjacent sections 11 of the glazing vehicle area, roof-backlite in one single part as shown in FIG. 6. The subsequent steps are the same as the previous embodiment, and consequently an excellent degree of flushness between said two adjacent sections 11 is obtained.

In order to maintain its mechanical properties, the bent vehicle glass panel needs the step of cutting before cooling. After bending, the glass panel has zones in different states. Some zones are in glass transition state, as the central zone of the final bent glass panel, while others are in solid state, as the edges. The edges are cooled quickly because they are in contact with breezes and vapors, causing compression in their internal structure. Edge compression is favorable for the glass mechanical behavior. When cutting the edges before cooling completely, ensures the permanence of this property, which would not be possible when cutting after cooling, since cutting an edge which is already in compression, would weakens the glass and increase the probability of breakage.

Figure 7:
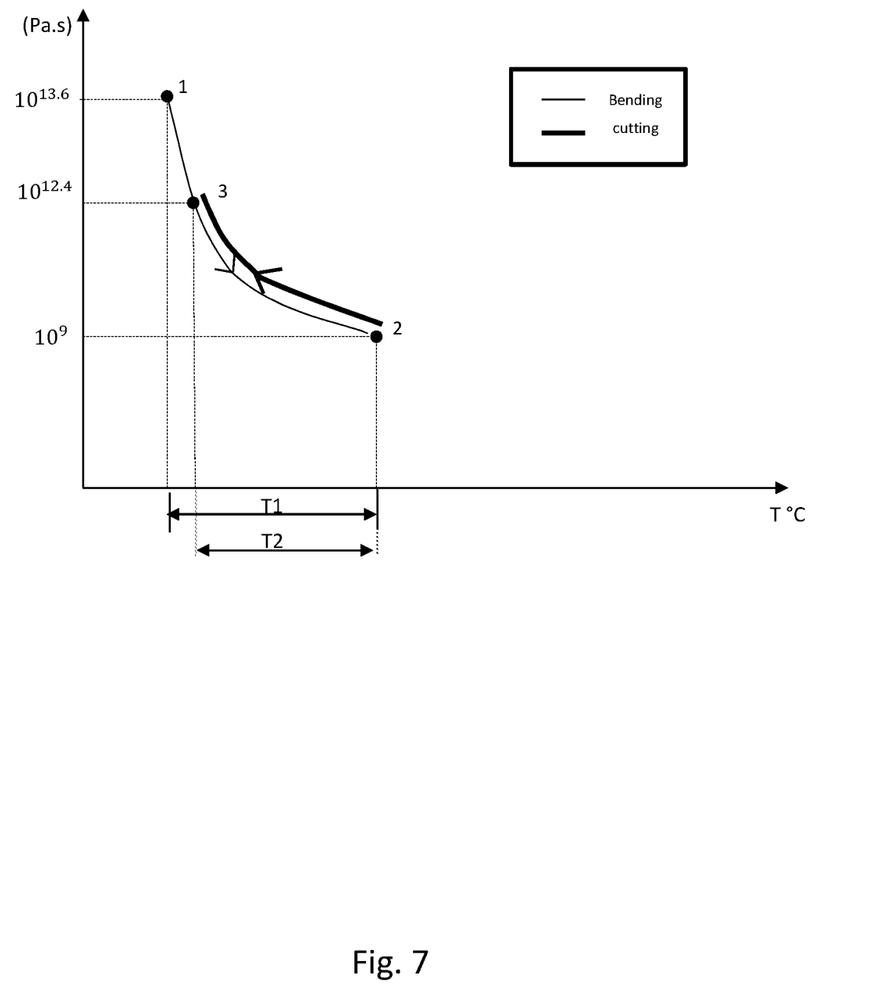
FIG. 7 shows the steps of the method with the three stages: bending, cutting and cooling, being $T_1$ and $T_2$ ranges of temperature.

FIG. 7 shows a graph viscosity (Pa·s) against Temperature (° C.) for a better appreciation of the steps of the method. Temperatures $T_1$ and $T_2$ represent ranges wherein is possible to reach different viscosities that allows to carry out the steps of bending and cutting. As is shown, after bending the vehicle glass panel at the temperature $T_1$, the bent vehicle glass panel needs to be cut before annealing, i.e cut while the local temperature along the cut line is temperature $T_2$. From point 1 to 2 the temperature of the vehicle glass panel increases for achieve the bending step. From point 2 to 3 the temperature of the vehicle glass panel decreases, at any point from 2 to at any point before 3, the vehicle glass panel could be cut to carried out the cutting step. Then, the temperature of the cut vehicle glass panel continues dropping in the cooling step (not shown).

In all the embodiments, the bending process is carried out by a technique selected from the group consisting of gravity bending, press bending and combinations thereof.

In preferred embodiments, the step of cutting the bent vehicle glass panel is carried out by a high-power LASER. In several embodiments, the high-power LASER is a diffusion-cooled gas LASER.

It must be understood that this invention is not limited to the embodiments described and illustrated above. A person skilled in the art will understand that numerous variations and/or modifications can be carried out that do not depart from the spirit of the invention, which is only defined by the following claims.

The invention claimed is:

1. A method of manufacturing a flush vehicle glazing, comprising the steps of:
   providing a vehicle glass sheet which comprises at least two adjacent sections of a vehicle glazing area;
   heating the vehicle glass sheet at a predetermined temperature $T_1$ for a predetermined period of time $t_3$ for bending the vehicle glass sheet by a bending process, wherein the temperature $T_1$ ranges from about a temperature at which the viscosity of the vehicle glass sheet is $10^{13.6}$ Pa·s to a temperature at which the viscosity of the vehicle glass sheet is $10^9$ Pa·s and the time $t_3$ is enough to impart a selected permanent curvature to the vehicle glass sheet;
   cutting the bent vehicle glass sheet in said at least two adjacent sections of the vehicle glazing area along a cut line, wherein the cutting step is conducted inside a furnace, while the cut line of the bent vehicle glass sheet stands at temperature $T_2$, wherein the temperature $T_2$ ranges from about a temperature at which the viscosity of the cut line of the bent vehicle glass sheet is $10^{12.4}$ Pa·s to a temperature at which the viscosity of the cut line of the bent vehicle glass sheet is $10^9$ Pa·s;
   cooling the vehicle glass sheet after cutting.

2. The method of claim 1, wherein the highest value of $T_1$ is greater or equal than temperature $T_2$.

3. The method of claim 1, wherein in the step of providing a vehicle glass sheet said at least two adjacent sections are selected from the group consisting of windshield-roof-backlite, windshield-roof and roof-backlite.

4. The method of claim 1, wherein in the step of heating the vehicle glass sheet, the bending process is carried out by a technique selected from the group consisting of gravity bending, press bending and combinations thereof.

5. The method of claim 1, wherein the step of cutting the bent vehicle glass sheet is carried out by a high-power LASER.

6. The method of claim 1, wherein the step of cooling the cut vehicle glass sheet is carried out in a mold.

7. The method of claim 5, where in the high-power LASER is a diffusion-cooled gas LASER.

8. The method of claim 5, wherein the cutting step generates smooth surfaces, improving the edge quality and glass hardness.

* * * * *